US010218880B2

(12) United States Patent
Fredlund

(10) Patent No.: US 10,218,880 B2
(45) Date of Patent: Feb. 26, 2019

(54) METHOD FOR ASSISTED IMAGE IMPROVEMENT

(71) Applicant: John R. Fredlund, Rochester, NY (US)

(72) Inventor: John R. Fredlund, Rochester, NY (US)

( * ) Notice: Subject to any disclaimer, the term of this patent is extended or adjusted under 35 U.S.C. 154(b) by 152 days.

(21) Appl. No.: 15/424,934

(22) Filed: Feb. 6, 2017

(65) Prior Publication Data

US 2018/0227560 A1  Aug. 9, 2018

(51) Int. Cl.
*H04N 1/60* (2006.01)
*H04N 9/73* (2006.01)
*H04N 5/232* (2006.01)
*H04N 9/68* (2006.01)

(52) U.S. Cl.
CPC ....... *H04N 1/6077* (2013.01); *H04N 5/23293* (2013.01); *H04N 9/68* (2013.01); *H04N 9/735* (2013.01); *G09G 2320/0666* (2013.01)

(58) Field of Classification Search
CPC .......... H04N 1/60; H04N 1/6077; H04N 9/73; H04N 9/735; G09G 2320/0666
See application file for complete search history.

(56) References Cited

U.S. PATENT DOCUMENTS

| | | | | |
|---|---|---|---|---|
| 5,398,123 A * | 3/1995 | Katsuma | ................ | H04N 1/60 358/518 |
| 5,796,874 A * | 8/1998 | Woolfe | .................. | G06T 5/007 358/509 |
| 5,812,286 A | 9/1998 | Lin | | |
| 6,263,792 B1 * | 7/2001 | Fredlund | ................ | G03B 27/32 101/171 |
| 6,304,345 B1 * | 10/2001 | Patton | .................. | G03B 27/735 358/527 |
| 6,354,215 B2 * | 3/2002 | Fredlund | ................ | G03B 27/32 101/484 |
| 6,771,311 B1 * | 8/2004 | Weldy | ...................... | H04N 1/60 348/222.1 |
| 7,443,552 B2 * | 10/2008 | Risson | .................... | G06T 5/009 358/518 |
| 7,835,588 B2 * | 11/2010 | Parkkinen | ............... | G06T 5/009 382/168 |
| 7,936,920 B2 * | 5/2011 | James | ........................ | G06T 5/40 382/162 |
| 8,000,554 B2 * | 8/2011 | Li | ........................... | G06T 5/009 358/1.6 |
| 8,023,743 B2 * | 9/2011 | Makino | ..................... | G06K 9/48 348/222.1 |
| 8,331,721 B2 * | 12/2012 | Kasperkiewicz | ......... | G06T 5/00 345/590 |

(Continued)

*Primary Examiner* — John Villecco
(74) *Attorney, Agent, or Firm* — Louis S. Horvath

(57) ABSTRACT

A method for image processing acquires a digital image as a collection of image pixel data and identifies the acquired digital image as a faded image. One or more statistical values is calculated to characterize the distribution of digital image values over a range for a first color channel. The range of values for each of the color channels is expanded. At least first and second non-overlapping sub-ranges of the expanded range of values are identified for each of the color channels, wherein a boundary between the sub-ranges is defined according to the calculated statistical value for the first color channel. The first sub-range is expanded and the second sub-range for each of the color channels compressed to form a color balanced image that is displayed.

19 Claims, 12 Drawing Sheets

(56) References Cited

U.S. PATENT DOCUMENTS

| | | |
|---|---|---|
| 9,087,385 B2 | 7/2015 | Fredlund et al. |
| 9,270,867 B2 * | 2/2016 | Kim .................. H04N 1/40006 |
| 2001/0014238 A1 * | 8/2001 | Fredlund ................ G03B 27/32 |
| | | 400/61 |
| 2009/0190828 A1 * | 7/2009 | James ....................... G06T 5/40 |
| | | 382/162 |
| 2011/0228075 A1 * | 9/2011 | Madden ................. G03B 15/05 |
| | | 348/81 |
| 2012/0262473 A1 * | 10/2012 | Kim .................. H04N 1/40006 |
| | | 345/589 |
| 2013/0136352 A1 * | 5/2013 | Naccari .................... G06K 9/38 |
| | | 382/165 |
| 2014/0078340 A1 * | 3/2014 | Lin ........................ H04N 9/735 |
| | | 348/223.1 |
| 2014/0369601 A1 * | 12/2014 | Lee ......................... G06T 5/009 |
| | | 382/167 |

\* cited by examiner

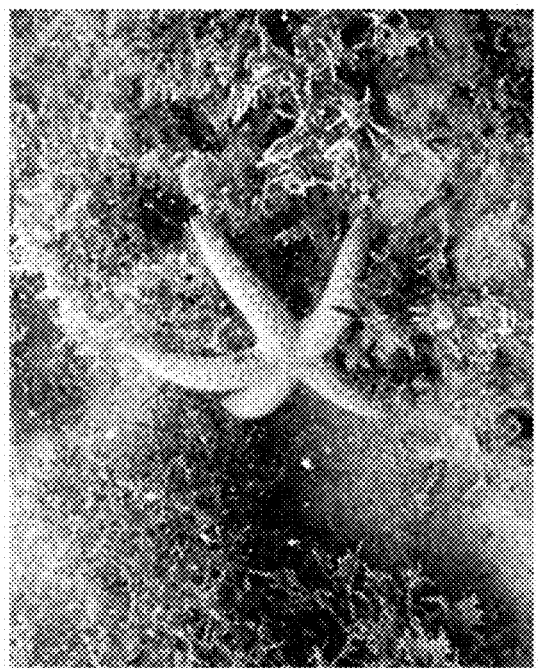
FIG. 7

METHOD FOR ASSISTED IMAGE IMPROVEMENT

FIELD OF THE INVENTION

The present invention relates to improvement of image files captured under various conditions and more particularly to a method for providing automated adjustment to improve color balance prior to subsequent manual adjustment of other image characteristics.

BACKGROUND OF THE INVENTION

There are numerous software tools commercially available that allow a user to make adjustments to digital images. Using software of this type, a user can process an uploaded image from a digital camera or a print or slide scanner to modify a range of image characteristics including color balance, brightness, contrast, sharpness, and saturation, as well as to perform editing functions such as cropping, enlargement, and rotation.

While image processing utilities such as Adobe Photoshop from Adobe Systems Incorporated provide capable tools for adjusting image appearance, there are a number of problems that confront the casual user. Some adjustments, such as for image brightness, are straightforward and have little or no impact on other characteristics of the rendered image. Spectral characteristics such as color balance, on the other hand, can be difficult to adjust properly and it can be relatively easy for the inexperienced user to get unsatisfactory results. Often, for example, attempts to correct for a previous adjustment do not achieve the results anticipated and can cause confusion and frustration to the end user.

Further difficulties arise from variation between images taken under diverse conditions. Images taken underwater, for example, can have distinctly different color balance characteristics from those taken in air, as described in commonly assigned U.S. Pat. No. 9,087,385 to Fredlund et al.

Given the difficulties relating to achieving adjustment of an image so that it is both realistic and pleasing to the eye, it can be seen that there is a need for tools that allow the casual user to improve the quality of camera or scanned images without requiring extensive training or expertise in image manipulation techniques.

SUMMARY OF THE INVENTION

It is an object of the present disclosure to advance the art of image processing and adjustment and to address the need for utilities that can provide a level of image quality control suitable for the casual user. Advantageously, the method of the present disclosure provides solutions that can be used for images taken under a variety of conditions and supports user-initiated adjustments with a level of automated processing.

According to an embodiment of the present invention, there is provided a method for image processing, the method executed at least in part by a computer system and comprising:
    acquiring a digital image as a collection of image pixel data;
    identifying the acquired digital image as a faded image;
    calculating one or more statistical values that characterize the distribution of digital image values over a range for a first color channel;
    expanding the range of values for each of the color channels;
    identifying at least first and second non-overlapping sub-ranges of the expanded range of values for each of the color channels, wherein a boundary between the sub-ranges is defined according to the calculated statistical value for the first color channel;
    expanding the first sub-range and compressing the second sub-range for each of the color channels to form a color balanced image; and
    displaying the color balanced image.

The above and other objects, advantages and novel features of the present invention will become more apparent from the accompanying detailed description thereof when considered in conjunction with the following drawings.

BRIEF DESCRIPTION OF THE DRAWINGS

Embodiments of the invention will now be described with reference to the drawings in which:

FIG. 7 is a plan view that shows an adjusted image.

DETAILED DESCRIPTION OF THE INVENTION

The present description will be directed, in particular, to image manipulation techniques used in accordance with the present invention, it being understood that elements not specifically shown or described may take various forms well known to those skilled in the art.

Where they are used in the context of the present disclosure, the terms "first", "second", and so on, do not necessarily denote any ordinal, sequential, or priority relation, but are simply used to more clearly distinguish one step, element, or set of elements from another, unless specified otherwise.

In the context of the present disclosure, the terms "viewer" and "user" are considered equivalent. The terms "image" and "image data" can be used equivalently herein, since both represent image content, considered from different perspectives, as data or as displayed data.

For procedures described herein, various types of image statistics and statistical metrics can be computed and used. These can include various combinations of mean, median, mode, standard deviation, skewness, variance, kurtosis, and other statistical metrics that characterize a distribution of data over a range.

The Applicants have recognized that color balance adjustment, such as to compensate for color cast in the image, can be difficult, even for users with some experience. This is, in part, due to the complexities of color space and to spectral differences inherent to various types of display and print devices. In practice, many users do not fully understand color channels and how they are used. In effect, color balance adjustments are often not independent of each other; color space is not "orthogonal" in practice.

Figure 1:
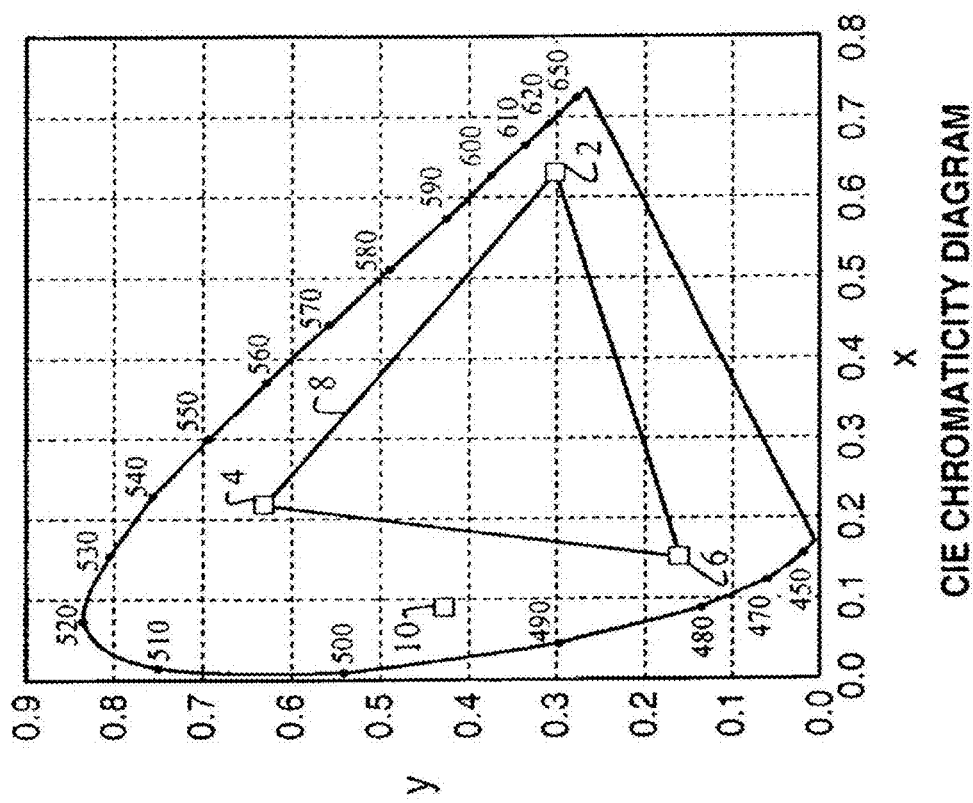
FIG. 1 shows a color gamut for an imaging device using the 1931 CIE chromaticity prior art diagram.

The non-orthogonal aspect of color balance can be readily grasped by considering how color space is represented by those skilled in the imaging arts. A number of different models for color space have been developed to provide metrics for color perception, based on the trichromatic nature of human color vision. Some of the more familiar color space models used for quantitative description of a color include, for example, CIE (Commission International de l'Eclairage) L*a*b*, L*u*v* [C.I.E. Publication 15.2, 1986], YUV, and the 1931 CIE xyY system. By way of example, FIG. 1 shows a color gamut for an imaging device using the 1931 CIE chromaticity diagram. Representative wavelength values (in nm) are shown along edges of the full color gamut. A triangular-shaped color gamut 8 for a typical printer or display device can be defined within an overall color gamut by chromaticity coordinates of a set of red 2, green 4, and blue 6 color display primaries. Any color within the color gamut is formed using a linear combination of the red 2, green 4, and blue 6 primaries. However, the red, green, and blue values used to define a point representing a color are not wholly independent of each other; shifting between two points within the color space typically involves more than one of the primary color values.

Thus, for example, changes to one color channel can sometimes have perceptible effects on the other color channels for a displayed image. This is particularly true with perceptions of changes at differing regions of the tonal scale. This effect greatly complicates the task of adjusting color balance for the inexperienced user, since it can be difficult to recreate an adjustment sequence on similar images or to "back-track" through successive adjustment steps to return to an earlier adjustment condition in a series of adjustments.

Other types of image adjustment, on the other hand, are at least substantially independent of color balance and can be considered orthogonal with respect to color adjustment. Brightness and contrast adjustments, for example, do not perceptibly impact color balance. Brightness adjustment tends to act globally, affecting saturation and other characteristics of all colors, without changing the color balance. Contrast adjustment tends to expand the tonal range and distribution, again without affecting color balance. This relative independence from color balance is also true for a number of other adjustment types, such as sharpening.

Given the relative complexity and interdependence of color balance adjustment, embodiments of the present disclosure provide automated utilities that apply color science principles and practices for color balance adjustment of the acquired image. Following this automated adjustment, the viewer is then provided with other manual adjustments for image characteristics that have little or no perceptible impact on color balance, but that can be used to achieve a desired effect and appearance for the adjusted image.

Figure 2:
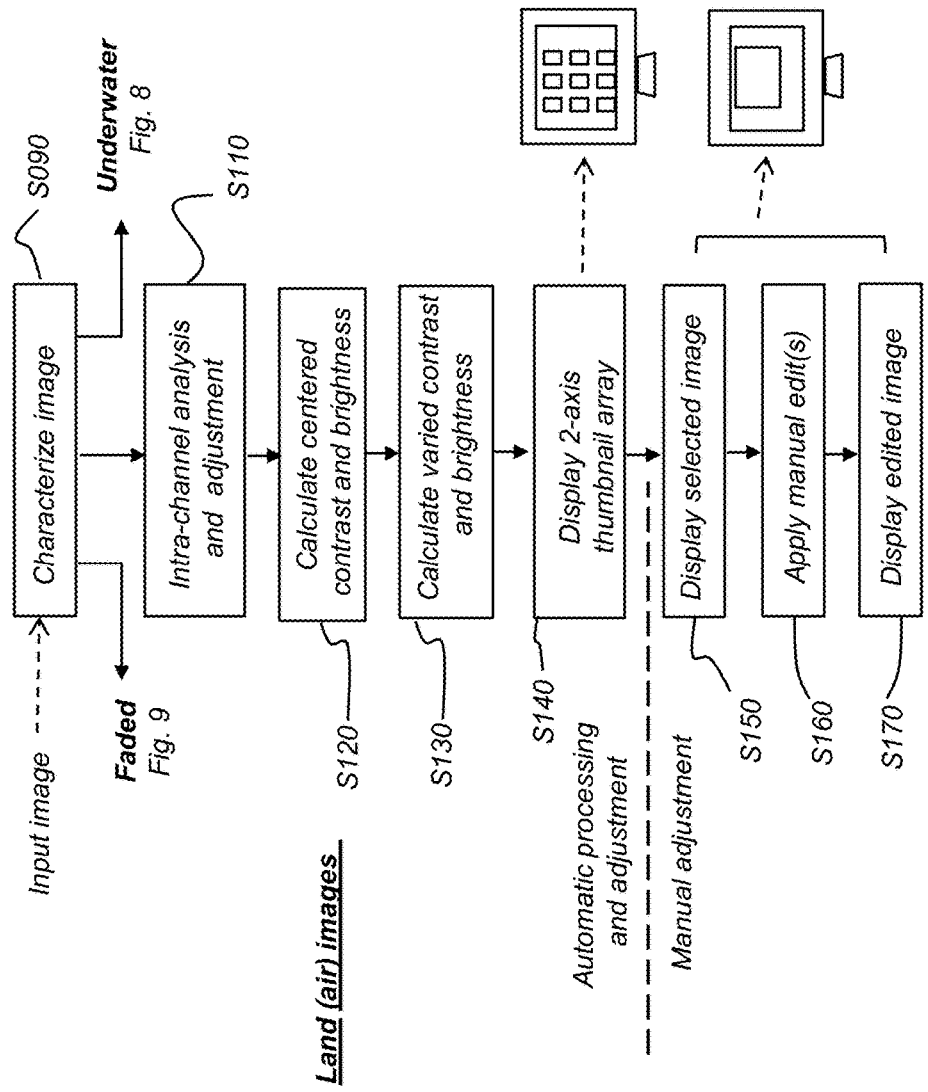
FIG. 2 is a logic flow diagram that shows a sequence of steps for assisted image improvement.

FIG. 2 is a logic flow diagram that shows a sequence for processing an acquired digital image provided as image pixel data from a camera, cell phone, smart phone, or other image capture device according to an embodiment of the present disclosure. The procedure shown includes automated portions executed by a computer or other logic processing device as well as steps that are executed by a computer according to input instructions entered by a user. In an image assessment step S090, the input image is assessed to determine a subsequent processing logic sequence, based on image characteristics. The image can be a faded image, such as an image from an early camera or other device; processing for faded images is described in more detail in FIG. 9. Alternately, the image can be a conventional image, processed using subsequent steps beginning with an intra-channel analysis step S110 shown in FIG. 2. As yet another alternative, the image could be an underwater image, as can be indicated by scene and overall color content. Processing for underwater images is described in detail with reference to the following FIG. 8.

Image characterization in image assessment step S090 can be automated, based on image metrics, such as color channel histograms, or can use information provided from an operator, such as from a Land, Sea, or Faded Image button or other command entry mechanism that provides user instructions on a graphical user interface (GUI). Determining algorithmically that an image was captured in air or in an underwater environment can be performed, for example, using a computerized statistical analysis of the image pixel data, as described in previously cited U.S. Pat. No. 9,087,385 to Fredlund et al.; additional details on underwater environment detection can also be found in U.S. Pat. No. 6,263,792 to Fredlund. Processing may use other types of image analysis that ascertain whether or not the image has characteristics of an underwater image. This optional analysis may determine, for example, that an image can be improved using the process that follows, whether or not the image was originally acquired underwater; alternately, processing may offer the option to exit where the image does not appear suitable for processing.

Continuing with the process flow of FIG. 2 for standard images not taken underwater and not considered as faded images, an intra-channel analysis and adjustment step S110 adjusts color balance for the image. Color channel expansion can be applied as part of color balance adjustment in step S110. Color channel expansion adjusts the range of image data values, and corresponding distribution of tone values within each color channel of the subject image. According to an embodiment of the present disclosure, step S120 can adjust color channel values using any of the following sequences:

(i) a linear expansion that proportionately increases the tone range for color channel data values and effects re-distribution of values in a uniform manner;
 (ii) a non-linear expansion that increases the tone range of color values according to statistical metrics or predominant data values, then reassigns values within the increased range according to a statistical distribution; or
 (iii) a combination such as initially performing a linear expansion, then using statistical data from the original distribution of values in the color channel to re-assign color values within the color channel, adjusting the tone range in a non-linear manner, for example.

According to an embodiment of the present disclosure that is especially useful for older photographs, the user has the option to designate how color channel expansion of step S110 takes place by selection of any of a set of color channel adjustment parameters based on image characteristics, such as the following:

- Faded black & white, obtaining a non-linear expansion of monochrome data values along with contrast and brightness adjustment.
- Faded color, obtaining a non-linear expansion of color channel data values along with contrast and brightness adjustment.
- Pixel preservation, uniquely re-mapping each pixel non-linearly to a newly assigned value, without clipping of assigned values.
- Digital camera or cell phone image, providing only brightness and contrast adjustment, without color balance adjustment.
- Moderate pixel preservation, re-mapping each pixel linearly to a newly assigned value, without clipping of assigned values.

In color channel expansion during step S110, each color channel can be separately expanded. The expansion parameters can be unique to each channel and unique to each image. Selection of an adjustment method can be made by the operator or designated by system logic, based on attributes discerned from the image data or based on statistical analysis for a large population of images.

Analysis and adjustment step S110 also provides an initial analysis for brightness and contrast using one or more channels of the image individually. For example, the Green color channel, in the RGB (Red/Green/Blue) model, is typically a useful indicator of image luminance. Thus, processing in step S110 uses the Green channel data, such as range and mean value, for obtaining brightness data used for subsequent calculations, modifying the color channel values according to experience curves, obtained from analysis of a population of images, or other model or algorithmic approach. As part of color balance adjustment, color channel expansion can be executed within each color channel. This process takes the existing color range in a channel and expands the range, increasing the higher values and decreasing lower values while maintaining the overall relative distribution of color values. Color histogram adjustment can be effected, using techniques familiar to those in the image processing arts. Contrast can also be improved as part of step S120. Step S120 provides, as an output, an adjusted image with improved color balance, termed a centered image, displayed in subsequent steps. At the conclusion of step S120, the color-balancing process is complete. Subsequent adjustments by the system or performed by the user can change various aspects of image appearance, but cause little or no perceptible change to color balance obtained for the centered image.

Continuing with the FIG. 2 sequence, a brightness and contrast variation step S130 then modifies the centered image of the acquired subject input image data. This automated brightness and contrast adjustment can employ statistical data, based on a population of similar images, to compute new values for adjustment of brightness and contrast for the subject image, generating additional images varying in brightness and contrast about the centered image. An array display step S140 then displays a 2-D array of reduced-scale or thumbnail views of the centered image, surrounded by the generated images that vary in brightness and contrast.

According to an alternate embodiment of the present invention, a measure of training can be provided, by which data accumulated in using the software is used to affect how the software operates, such as by adjusting the linear or non-linear characteristics of brightness and contrast modification functions according to operator preferences for example.

Figure 3:
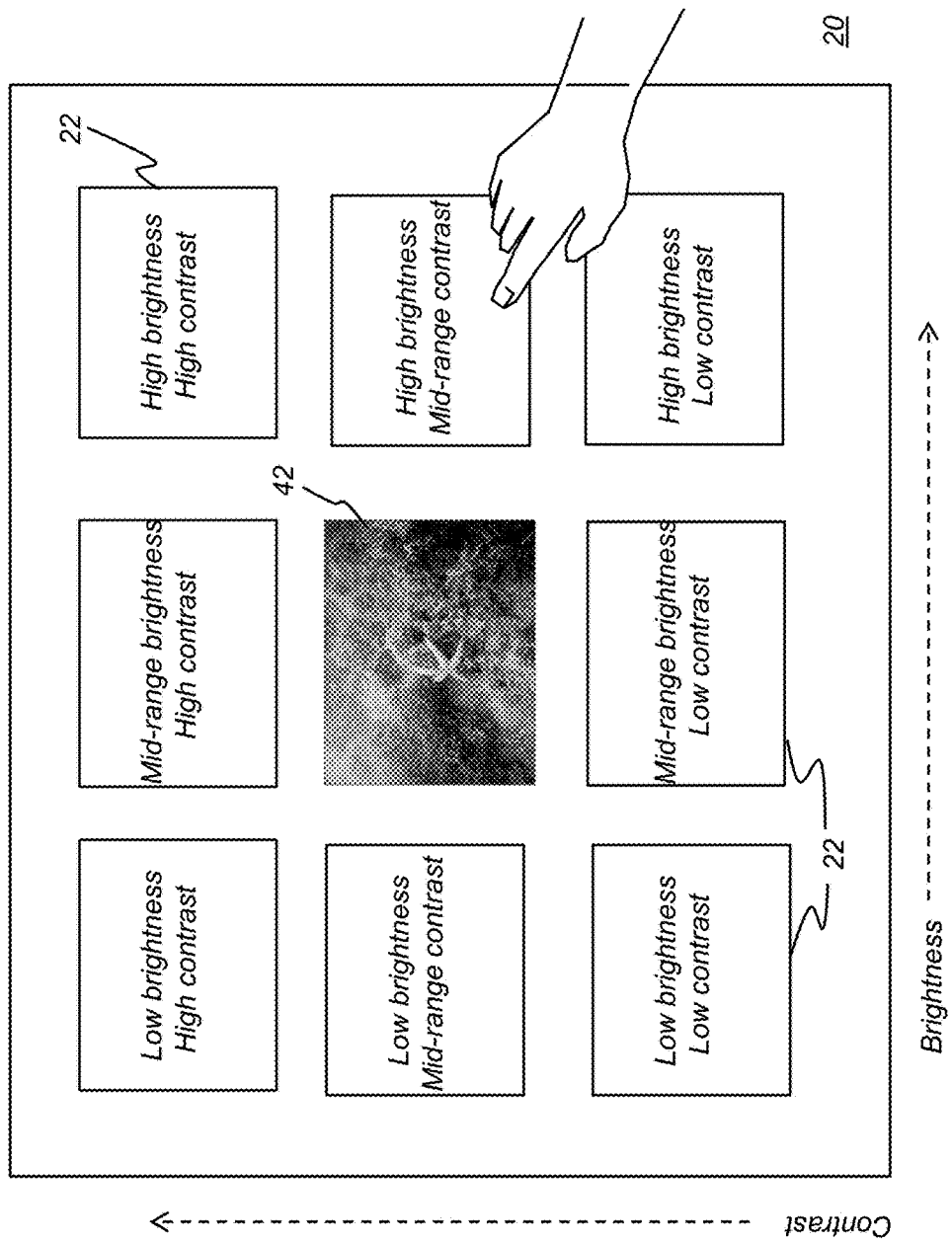
FIG. 3 is a plan view that shows a display of thumbnail images having brightness and contrast value adjustments for operator selection.

The plan view of FIG. 3 shows an exemplary 2-D array of reduced-scale or thumbnail images 22 arranged with increasing brightness for successive images along the horizontal axis direction and increasing contrast for successive images along the vertical axis direction. A centered image 42 is the result of color balance processing from the FIG. 2 sequence, and may also have a contrast and brightness adjustment. Each of the peripheral thumbnail images 22 have the same color balance, but with different brightness or contrast setting. The original image is not shown in the array.

Figure 4:
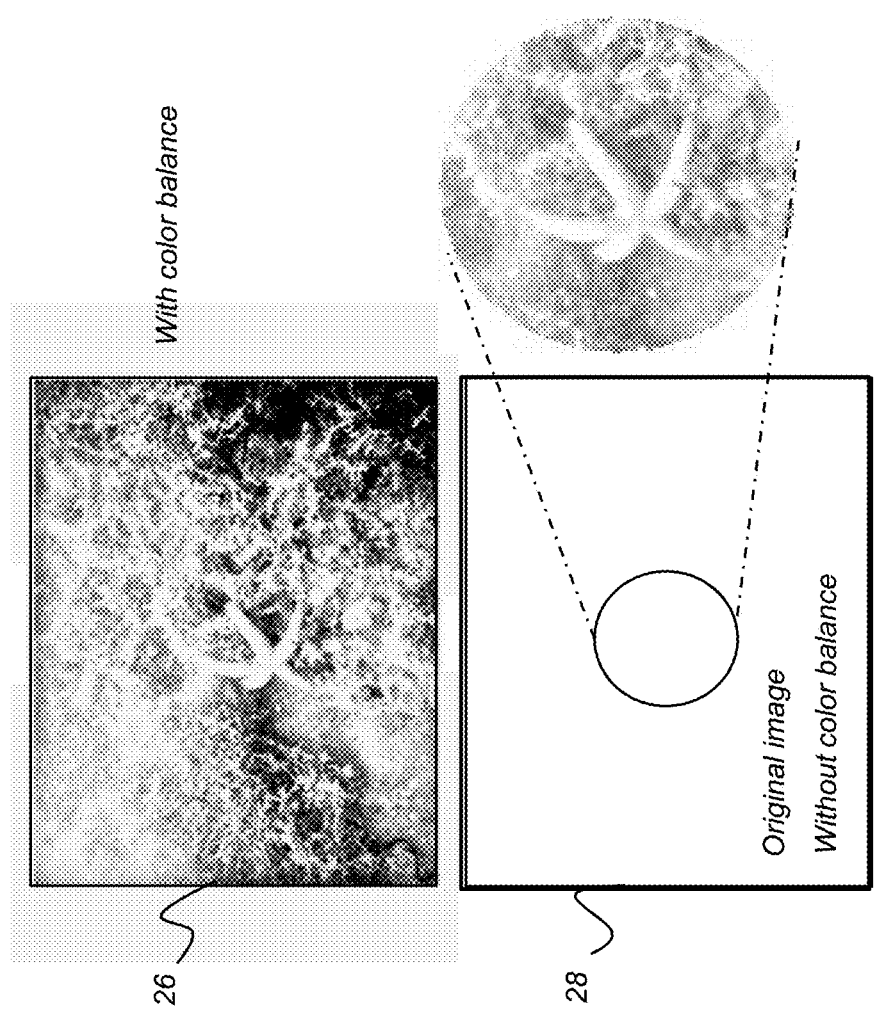
FIG. 4 is a plan view showing a corrected image along with the original, uncorrected image.

Returning to the sequence of FIG. 2, user interaction with the system obtains the final edited image results. In a display selected image step S150, the system accepts an operator selection of one of the thumbnail views from the 2-D array 20 shown schematically in FIG. 3. The system displays an enlarged image 26 as shown in FIG. 4, as selected in step S150, with color balance applied and as selected from 2-D array 20 and, optionally, also shows an original image 28, shown in part, which is the acquired digital image without color balance adjustment from step S120 (FIG. 3), or subsequent automatic brightness and contrast adjustments. In a manual adjustment step S160, the system accepts an operator instruction for image adjustment. The adjustment can be a brightness or contrast adjustment, for example, that changes image appearance without affecting the automatic color balance adjustment obtained in steps S120 and S130. Alternatively, controls may be provided in step S160 that can affect the automatic color balance adjustment.

Figure 5:
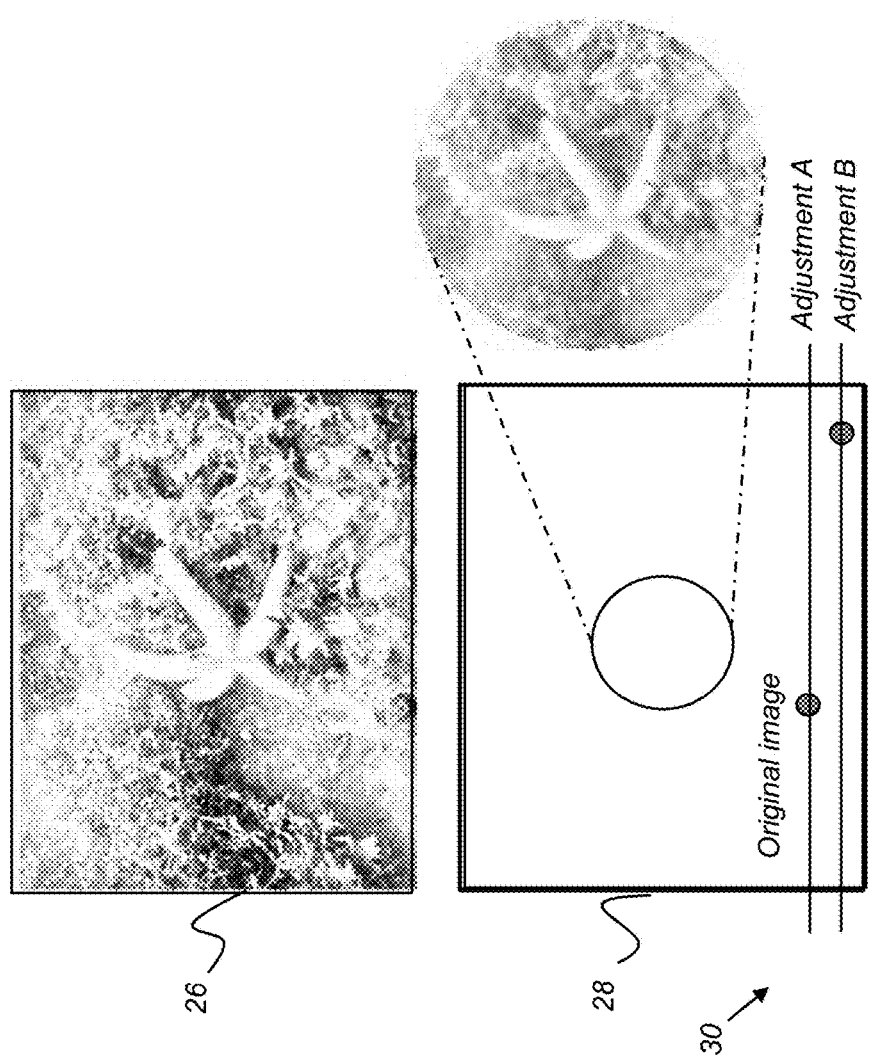
FIG. 5 is a plan view of the display showing one set of operator controls for adjustment.

As is shown in FIG. 5, initial adjustment in manual adjustment step S160 can include further brightness and contrast adjustments using on-screen controls 30. Depending on the image color characteristics that are controlled, adjustments A and B of FIG. 5 may not perceptibly affect color balance, but can offer constrained adjustment of image characteristics that preserve color balance. Alternately, adjustments A and B can be obtained with controls 30 that provide depth removal, adjusting Red channel values or an emerald filter that adjusts Blue channel values. A display step S170 can then display the operator-adjusted image.

Other available adjustments that preserve color balance can include image sharpness. Image cropping and rotation tools can also be available, again without impact to the color balance that was achieved automatically.

Figure 6:
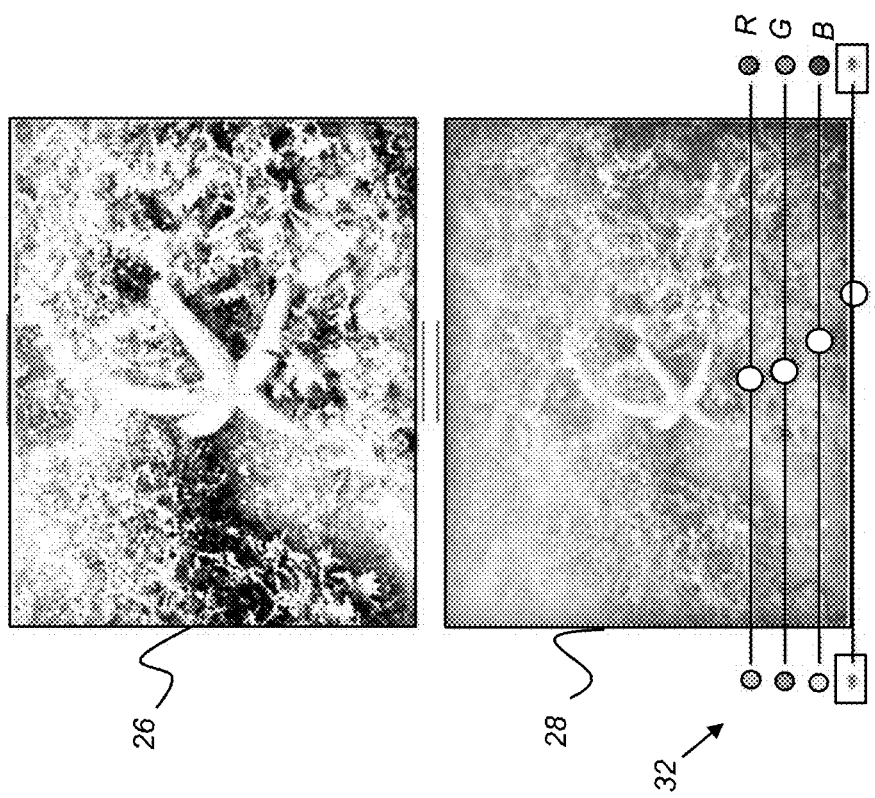
FIG. 6 is a plan view of the display showing alternate operator controls for adjustment.

FIG. 6 shows another optional operator adjustment that can provide limited intra-channel adjustment of color balance, within predetermined constraints imposed by the system. Slight offset adjustment to each color channel R, G, B can be provided using on-screen controls 32. FIG. 7 shows an operator-adjusted image 36, displayed at an enlarged scale. Controls 38 are available for reversing operator adjustments and restoring the image to an earlier state, as well as for saving the image or transmitting the image to another site or address. Reversal of operator adjustments can reverse the sequence of manual adjustments performed as part of step S160 and can return the process of FIG. 2 to step S120.

Processing Underwater Images

Figure 8:
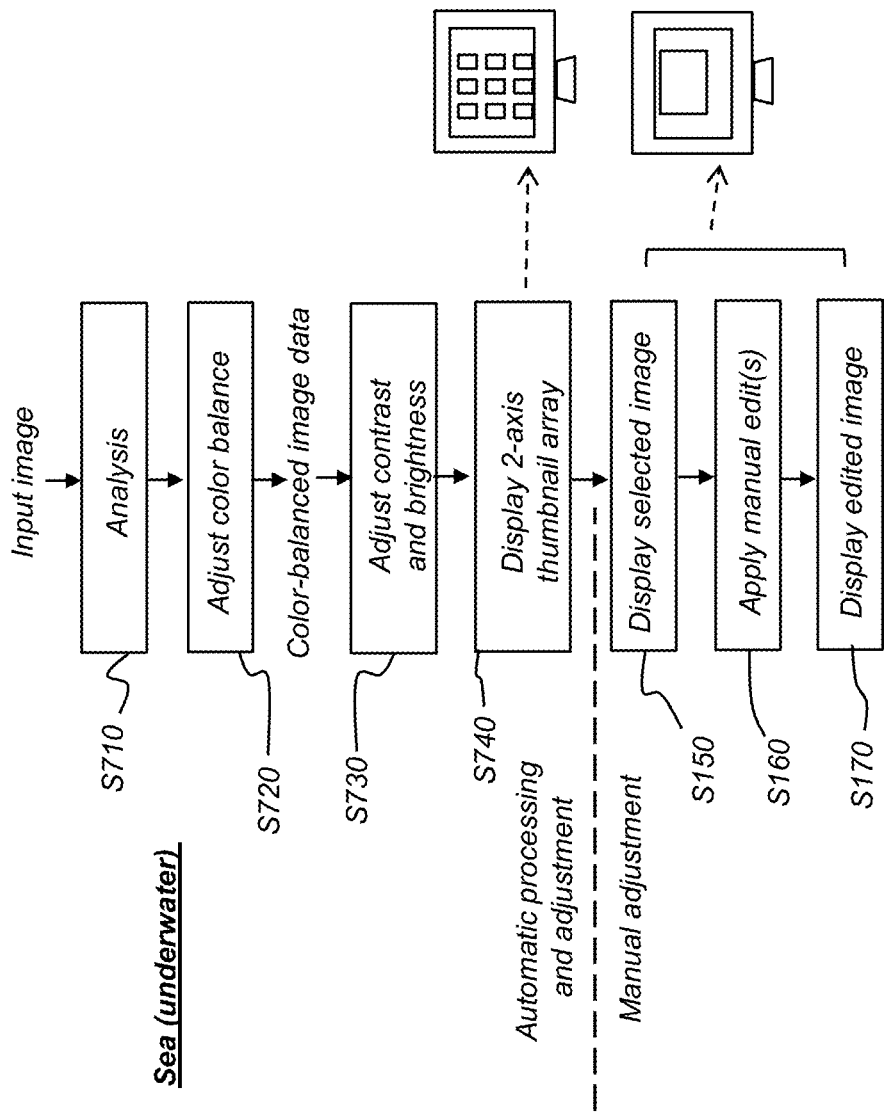
FIG. 8 is a logic flow diagram that shows an alternative processing sequence for assisted image improvement for underwater images.

The logic flow diagram of FIG. 8 shows alternative steps that can be executed where it is indicated by the user, or determined by image analysis (Step S090 in FIG. 2), that the subject image was acquired underwater. An analysis step S710 analyzes the image to obtain metrics indicative of color balance, contrast, and brightness.

Analysis step S710 can use both intra-channel and inter-channel analysis to compute a color balance adjustment for the underwater image. Intra-channel analysis provides statistical data computed from the distribution of data values for an individual color channel, without consideration for values from other color channels. With inter-channel analysis, data within a channel can be conditioned by statistical data from a different channel. Thus, for example, inter-channel analysis can adjust Red channel values for the image according to calculated statistics from Green channel values.

Continuing with the FIG. 8 sequence an adjustment step S720 adjusts the color balance accordingly to form a color-balanced image or, alternately stated, to generate color-balanced image data. According to an embodiment of the present disclosure, some coefficient of the Green channel can be used to adjust Red and Blue channels, such as adjustment weighted by the Green channel data. A subsequent adjustment step S730 then adjusts contrast and brightness for providing a centered image 42, as was described with reference to FIG. 3 along with images having the same color balance as the centered image, but varied in contrast and brightness. The adjusted image can then be displayed. In the sequence shown, an array display step S740 then displays a 2-D array of reduced-scale or thumbnail views of the color balanced image. Contrast adjustment can be provided along one axis, with brightness adjustment displayed along the other axis.

Steps S150, S160, and S170 in FIG. 8 are equivalent in function to the same numbered steps in FIG. 2, allowing manual editing of image brightness and contrast by the user. Additional editing available for underwater images can include depth removal. Depth removal is a pixel-specific, inter-channel color balance adjustment, proceeding from one pixel to the next and optionally adjusting the value for one channel according to corresponding values of another channel for that pixel. At the conclusion of this processing, display step S170 displays the image results from manual adjustment by the operator.

Processing Faded Images

Figure 9:
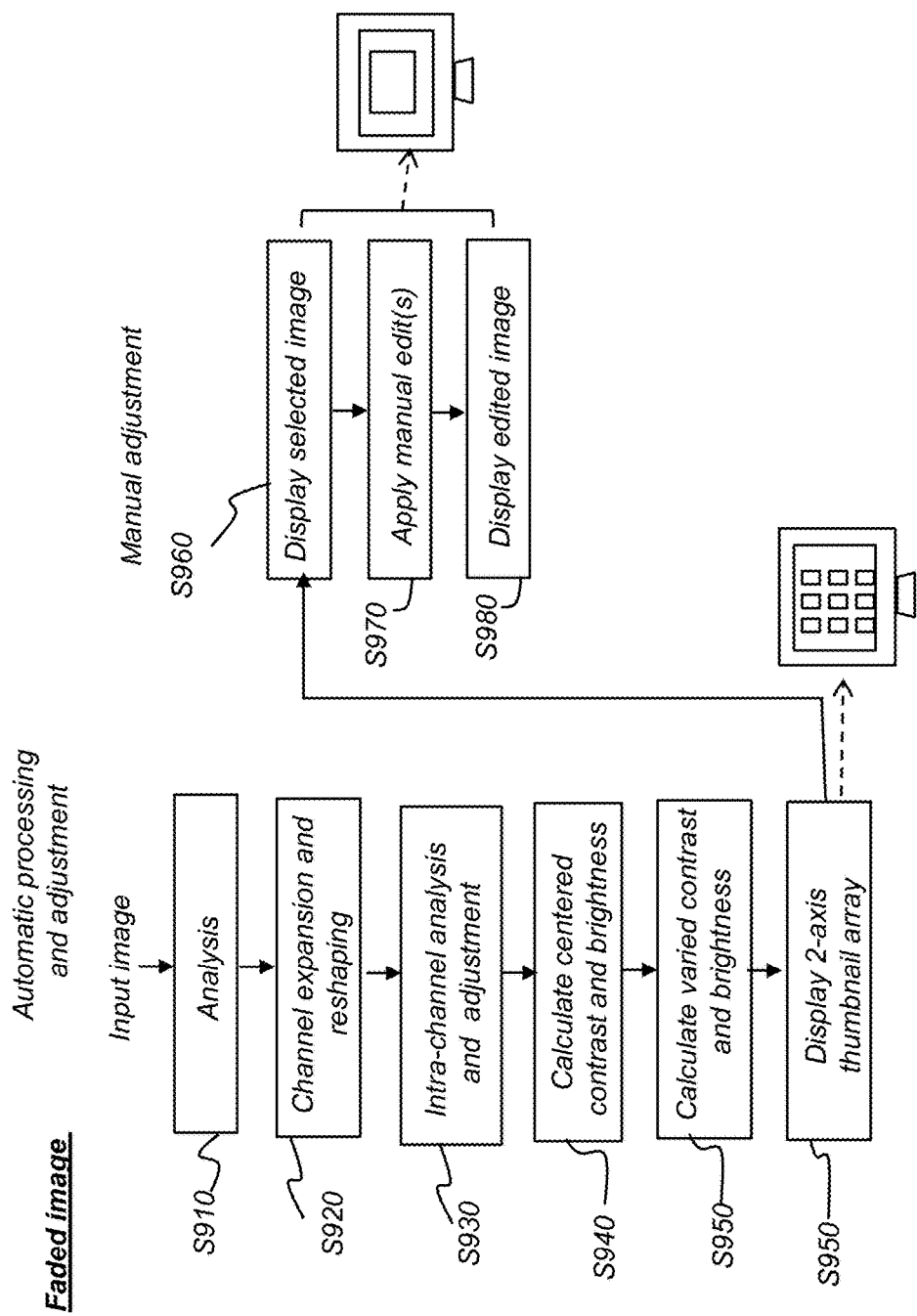
FIG. 9 is a logic flow diagram that shows an alternative processing sequence for assisted image improvement for faded images.

The logic flow diagram of FIG. 9 shows the alternative processing that can be used for faded images detected in image assessment step S090 of FIG. 2. An analysis step S910 performs an intra-channel analysis of the input image, with particular interest in determining the range and characterizing the distribution of values within each channel. As part of analysis step S910, each color channel can be assessed for compression of values within each channel, such as by calculating statistical distribution metrics indicative of a faded image. This can include evaluating variables such as overall range and compression, for example.

Using algorithmic processing, a faded image can be detected where the range of color channels is relatively small and has characteristic shifting of color content, varying by channel. For the Red channel, for example, values of a faded image generally tend to be compressed and shifted upward in value. For the Green channel, compressed values are generally centered about a middle range. For the Blue channel of a faded image, values tend to be compressed and generally shifted downward in value. Where the color channel shows fading of image color content, processing can continue with a channel expansion and reshaping step S920, described in more detail subsequently.

Following channel expansion and re-distribution of values, an analysis step S930 then performs a second intra-channel analysis on the expanded data. The intra-channel analysis characterizes the distribution of modified image content and can calculate and compare values for brightness and contrast using one or more channels of the image individually. For example, the Green color channel, in the RGB (Red/Green/Blue) model, is typically a useful indicator for characterizing image luminance. Thus, processing in step S930 can use the Green channel data, such as range and mean value or other statistical characterization, for obtaining brightness data used for subsequent calculations, further modifying one or more of the color channel values according to experience curves obtained from analysis of a population of images, or using some other model or algorithmic approach. Color histogram adjustment can be effected, using techniques familiar to those in the image processing arts. Contrast can also be improved as part of analysis step S930. Step S930 provides, as an output, an adjusted image with improved color balance, termed a centered image, displayed in subsequent steps. At the conclusion of step S930, the color-balancing process is complete. Subsequent adjustments by the system or performed by the user can change various aspects of image appearance, but cause little or no perceptible change to color balance obtained for the centered image.

Continuing with the FIG. 9 sequence, a brightness and contrast variation step S940 then modifies the centered image of the acquired subject input image data. This automated brightness and contrast adjustment can employ statistical metrics, based on a population of similar images, to compute new values for adjustment of brightness and contrast for the subject image, generating additional images that vary in brightness and contrast about the centered image. An array display step S950 then displays a 2-D array of reduced-scale or thumbnail views of the centered image, surrounded by the generated images that vary in brightness and contrast.

According to an alternate embodiment of the present invention, a measure of training can be provided, by which data accumulated in using the software is used to affect how the software operates, such as by adjusting the linear or non-linear shapes of brightness and contrast modification functions according to operator preferences for example.

Continuing with the sequence of FIG. 9, user interaction with the system obtains the final edited image results. In a display selected image step S960, the system accepts an operator selection of one of the thumbnail views from the 2-D array 20 of FIG. 3. The system displays an enlarged image 26 as shown in FIG. 4, as selected in step S960, with color balance applied and as selected from 2-D array 20 and, optionally, also shows an original image 28, which is the acquired digital image without color balance, brightness and contrast adjustment from preceding steps. In a manual adjustment step S970, the system accepts an operator instruction for image adjustment that changes image appearance without affecting the automatic color balance adjustment obtained in preceding steps. As is shown in FIG. 5, initial adjustment in manual adjustment step S970 can include further brightness and contrast adjustments using on-screen controls 30. These initial adjustments do not perceptibly affect color balance, but offer constrained adjustment of image characteristics that preserve color balance. A display step S980 can then display the operator-adjusted image.

The method of the present disclosure can be applied to varied types of faded images having different appearance. Where an original print still has many different colors, even though the retained color may be not true to the original and badly faded, the method provides a means to restore the original color quality to some extent. The assumption implicit in the method described herein is that the original image was fairly well created and that the mechanism of the unwanted appearance is normal fading over time. Thus, using the method described herein, the color channels are expanded to approximate a well exposed and properly printed original. Fading can also be corrected for monochrome images having only a single color channel.

It should be noted that the mechanism for restoring faded images is inappropriate for underwater images, because the assumption that the original was captured properly is often not valid. Underwater images are affected in various ways by depth, distance from subject, and water quality. Thus a different correction scheme is necessary for proper color balance correction of underwater images.

Channel Expansion and Reshaping

Figure 10:
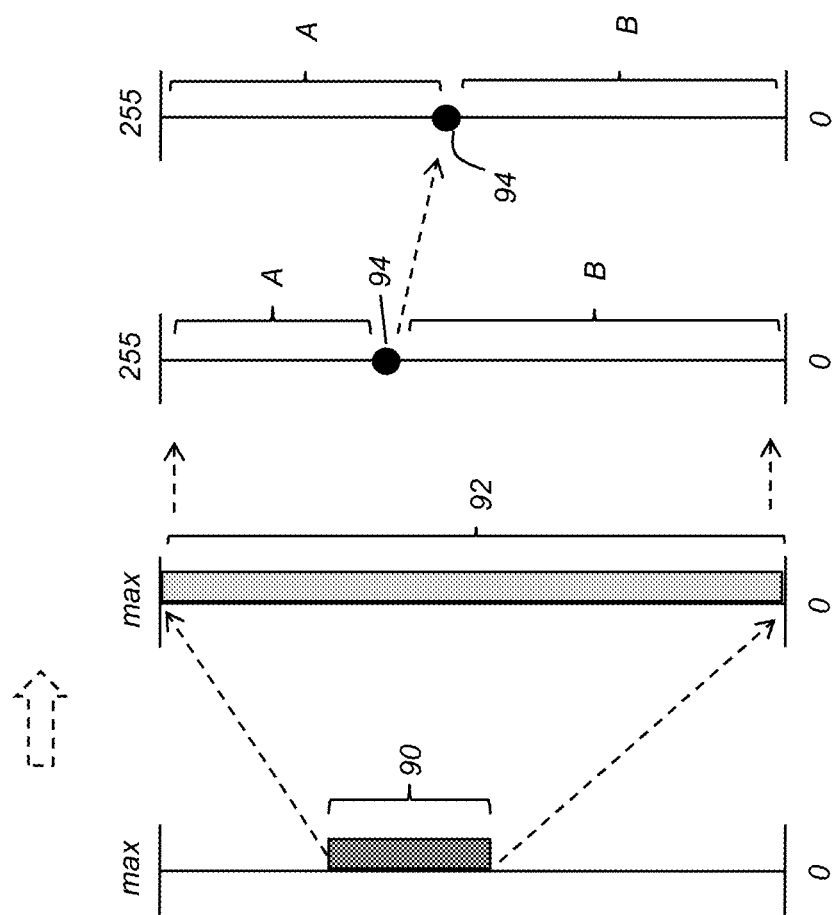
FIG. 10 is a schematic diagram that shows a sequence for channel expansion and reshaping.

The schematic diagram of FIG. 10 shows how channel expansion and reshaping step S920 can be executed for a faded image as described with reference to the FIG. 9 sequence. Independent expansion of each of the channels in faded color images can provide color balance adjustment for the image without consideration of the inter-channel color content. That is, color balance adjustment can be achieved using the method shown in FIG. 10 without comparison of the content of any of the channels.

The FIG. 10 process proceeds from left to right as follows:
  (i) The original faded image has a range 90 that is compressed, typically in a nonlinear manner, with values between 0 and a maximum value only in the limited range of values shown.
  (ii) A linear expansion is then applied, reversing the compressed state of range 90 to generate a modified image having an expanded range 92. Where the data is at higher resolution than 8-bit resolution, the higher resolution is retained for channel expansion in order to avoid posterization and other image artifacts. Conversion to 8-bit form is deferred until subsequent processing.
  (iii) A mean or median value 94 is computed for the expanded image data. Mean or median value 94 defines the boundary between sub-ranges. The values of the expanded range that are higher than the mean or median 94 occupies a range segment or sub-range A. Values lower than the mean or median 94 are spread over a range segment or sub-range B. Sub-ranges A and B are non-overlapping, each defined over a particular range. Where the channel data is more than 8-bit data, a further calculation is performed to convert the channel data to 8-bit form for display.
  (iv) An adjustment is applied to the mean or median 94, such as centering this value over the full available range. As a result, range segment A expands. Range segment or sub-range B is compressed in this example.

The final image from the process shown in FIG. 10 is expanded in a non-linear fashion and can be further reshaped using an appropriate transform or using a predetermined look-up table (LUT). Individual segments A and B can be transformed in linear or non-linear manner.

Figure 11:
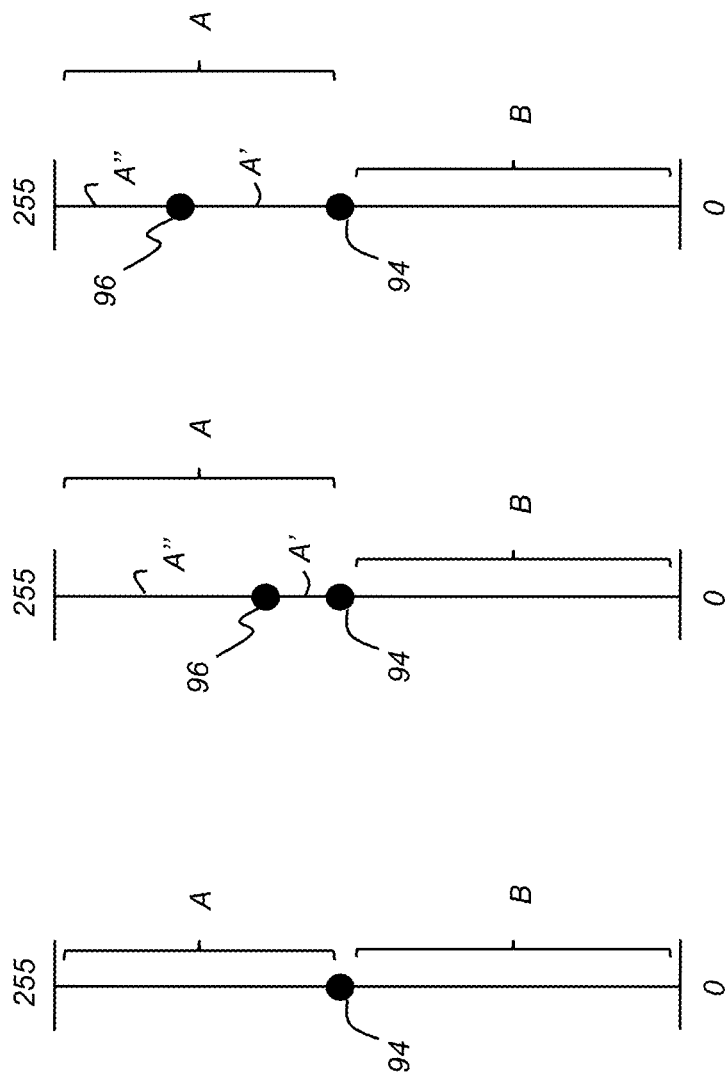
FIG. 11 is a schematic diagram showing a sequence for further channel reshaping.

Additional inflection points or points used otherwise for curve shaping, including points of discontinuity, may be selected in addition to the mean or median to re-shape the curve in a non-linear manner, or with additional segments. Operator interface utilities can be provided for curve-shaping, using techniques familiar to those skilled in the image processing arts. The alternate sequence shown schematically in FIG. 11 uses an additional point 96 as a "handle" for curve adjustment. In the example shown, sub-range A is split into two further non-overlapping sub-ranges, shown as segments A' and A". The relative position of point 96 is adjusted, effectively expanding values in the sub-range denoted as segment A' and compressing values in segment A". Depending on the data encoding scheme that applies, this adjustment could be used to enhance the midtone range and to diminish highlight effects, for example. It can be appreciated that additional points 96 could be used for adjustment of curve shape within each color channel. Sub-ranges at the upper and lower extremes of the value range can alternately be clipped.

Independent expansion of each of the channels in faded color images can be useful for achieving improved color balance by working with each color channel separately, without corresponding adjustment to other color channels at the same time.

Figure 12:
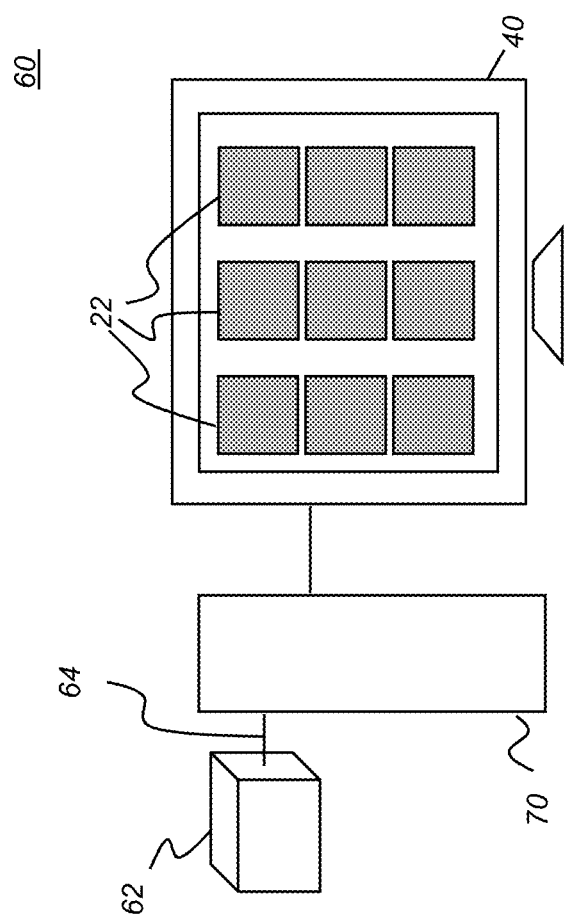
FIG. 12 is a schematic diagram showing an apparatus for assisted image improvement.

The schematic diagram of FIG. 12 shows components of an assisted image improvement system 60. A processor 70, such as a computer, tablet, smartphone, or laptop computer, stores and executes programmed instructions that provide the processing sequence described previously with respect to FIG. 2. An image acquisition apparatus 62, such as a camera or scanner, can provide image data input to processor 70 for program execution, such as through a cable 64, through a wireless connection, using some type of signal transmission, using a memory card, or using some other appropriate signal mechanism for image transfer. A display 40 displays thumbnail images 22 and provides control console functions for access by the user. It can be appreciated that any of a number of types of processor 70 can be provided and that the system can have any number of components, as well as being integrated into a single unit, such as in a smartphone, tablet, or other personal computer device.

Particularly for underwater images, statistical analysis of the selected image can be useful because there can be significant variation within a set of underwater images due to factors such as relative depth, camera angle relative to the surface, distance to subject, water quality, available sunlight, use of flash illumination, and local water color, for example. Similarly, scans of old photos and slides exhibit various types of degradation due to factors relating to initial processing variables, storage conditions, dye or pigment types used in printing, and age. The applicants have found that, just as no single optical filter is suitable for all imaging conditions, no single color shift or other modification of the image data, if arbitrarily applied to numerous images captured underwater, yields the desired effect of improving all images. Thus, according to an embodiment of the present disclosure, image-specific improvements are determined for each image. Advantageously, an automated approach based on image color balance characteristics can help to improve images without requiring individual user attention for each image, without forcing the user to make more difficult adjustments to improve the color cast, and without forcing the user to understand the complexities of color balance adjustments that may involve non-orthogonal operations within color space, as described previously.

Advantageously, embodiments of the present disclosure can perform color channel adjustment with initial contrast and brightness adjustments over a range of values, then display the color-channel adjusted results to the user. The user thus has a useful starting-point for fine-tuning adjustments that do not require further color channel adjustment. By providing the user with a set of automated adjustments that enhance image appearance with little or no impact on color balance, an embodiment of the present disclosure helps to provide a more realistic and pleasing image output, with reduced risk of making adjustments that can degrade image appearance and that can be difficult to reverse.

According to an embodiment of the present disclosure, a computer program product using the method of the disclosure provides automatic adjustment of images and also saves measured values and corresponding user-selected improvements. Using the method of an embodiment of the present disclosure, the computer program product, running on a user computer or on a remote server automatically improves the user's images and records the results. The computer program product can send the saved measured values and corresponding user-selected improvements to a server with a repository for these data so that they can be incorporated with the data from other users for determination or re-calculation of a best fit line.

It should be noted that the term "memory", equivalent to "computer-accessible memory" in the context of the present disclosure, can refer to any type of temporary or more enduring data storage workspace used for storing and operating upon image data and accessible to a computer system, including a database, for example. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types.

It will be understood that the computer program product of the present invention may make use of various image manipulation algorithms and processes that are well known. It will be further understood that the computer program product embodiment of the present invention may embody algorithms and processes not specifically shown or described herein that are useful for implementation. Such algorithms and processes may include conventional utilities that are within the ordinary skill of the image processing arts. Additional aspects of such algorithms and systems, and hardware and/or software for producing and otherwise processing the images or co-operating with the computer program product of the present invention, are not specifically shown or described herein and may be selected from such algorithms, systems, hardware, components and elements known in the art.

Image analysis for determination of statistics or other features can be performed using a low resolution version of the captured image. All of the pixels in the image need not be analyzed to provide statistical data. Additionally, the improvements determined by the method of the disclosure can be applied to a low resolution representation of the image, and after the automatic improvement has been applied, the user can modify the amount of improvement via input from dials, sliders, typing numbers or other well known input means. When the user is satisfied with the improvements, the values determined are applied to the high resolution image while the user continues on to work on subsequent images.

Brightness and contrast modifications to pixels in an image can be done in concert across all the channels in the image, or can be applied separately in each channel. Similarly, sharpening of the image can be done selectively by channel. For underwater images in particular, this can provide advantages. Since most of the luminance information resides in the green channel, it is advantageous to sharpen only the green channel by methods such as the well known practice of unsharp masking. Additionally, since the red channel is often severely attenuated, much of the noise in the image is in the red channel, particularly after amplifying that channel. Blurring the red channel, for example by use of a low pass filter, minimizes the effect of any high frequency noise. Often, blurring the blue channel has a similar beneficial effect. As one alternative treatment, it can be effective to sharpen only one or more higher quality channels of an image, not sharpening a degraded or noisy channel, for example. An assessment of the quality of information in a channel may be performed, using approaches known to those skilled in the imaging arts, to determine if sharpening or blurring will have beneficial effect.

Other color spaces can be used to provide improvements. Other color spaces include, for example, YUV color space, CIELAB color space, and CMYK color space. For example, if the image is converted to YUV color space, sharpening is only applied to the luminance channel, and the two chrominance channels can be blurred or not modified. Also, different statistical data and calculations corresponding to the color space can be used to determine automatic improvements.

Video imagery can be corrected by techniques similar to those discussed above. In the case of video, the improvements can be calculated or selected for a single frame and then applied to all the frames in the entire video. In a preferred embodiment, the frames of a video clip are decompressed so that they exist as individual frames. At least one of the individual frames or a lower resolution version of the at least one frame is selected, either by statistical analysis of the video clip or by the user, as a typical or important frame for that video clip. Once selected, the frame is treated as a captured still image described above, and improvements are applied. When the user is satisfied with either the automatically selected improvements or his own modifications of the automatically selected improvements, the selected improvements are applied to each frame in the entire video clip.

In an alternative embodiment, frames from the video clip are analyzed to detect statistically significant diversion from the existing norm. That is to say that if the statistical analysis of individual video frames begins to differ significantly from the previous frames, it is an indication that different improvements may be desired. When a statistically significant difference has been detected, the user can be prompted to specify new improvements, or improvements can be applied automatically as specified above. In either case, different improvements are applied to different sections of the clip.

In the course of applying new improvements to a video clip, it is important that changes in contrast, depth removal, lightness, sharpness or any combination of these parameters be applied gradually so as not to alert a viewer that new improvements have been applied. The transition from one set of improvements to another can be applied over numerous consecutive video frames by applying an increasing percentage of the change. For example, if 100 frames are used for the transition, and the transition is linear, the 27th frame will have applied 27% of the full difference from the previous improvements to the next improvements. Note also that the transition need not be linear, and may take more or less frames to complete the transition.

It is to be understood that various other changes and modifications may be made without departing from the scope of the present invention. The present invention is defined by the following claims.

The invention claimed is:

1. A method for image processing, the method executed at least in part by a computer system and comprising:
   a) acquiring a digital image as a collection of image pixel data;
   b) for at least a first color channel, executing a first intra-channel analysis by calculating one or more statistical values that characterize the distribution of digital image values over a range;
   c) reshaping each color channel of the acquired digital image by:
   (i) expanding the range of values within the channel;
   (ii) identifying at least first and second non-overlapping sub-ranges of the expanded range of values, wherein a boundary between the sub-ranges is defined according to the calculated statistical value from the at least the first color channel;
   (iii) re-distributing values by expanding the first sub-range and compressing the second sub-range;
   d) for at least one of the reshaped color channels, executing a second intra-channel analysis according to the re-distributed sub-ranges of values for the reshaped color channel and modifying at least brightness data for the at least one reshaped color channel, according to an analysis of a population of images, to form a color balanced image;
   and
   e) displaying the color balanced image.

2. The method of claim 1 further comprising identifying the acquired digital image as a faded image according to an operator instruction.

3. The method of claim 1 wherein expanding the range of values for each of the color channels is performed using values from within the corresponding color channel.

4. The method of claim 1 wherein expanding the range of values within the channel applies a linear expansion.

5. The method of claim 1 wherein expanding the range of values within the channel applies a non-linear expansion.

6. The method of claim 1 further comprising clipping the first sub-range for one or more color channels.

7. The method of claim 1 further comprising calculating one or more additional statistical values that characterize the distribution of digital image values for the color balanced image over the range.

8. The method of claim 1 further comprising identifying the acquired digital image as a faded image by calculating the range of each of the color channels of the acquired digital image.

9. A method for image processing, the method executed at least in part by a computer system and comprising:
   acquiring a digital image as a collection of image pixel data;
   for at least a first color channel, executing a first intra-channel analysis by calculating one or more statistical values that characterize the distribution of digital image values over a range;
   reshaping each color channel of the acquired digital image by:
   (i) expanding the range of values within the channel;
   (ii) identifying at least first and second non-overlapping sub-ranges of the expanded range of values, wherein a boundary between the sub-ranges is defined according to the calculated statistical value from the at least the first color channel;
   (iii) re-distributing values by expanding the first sub-range and compressing the second sub-range;
   for at least one of the reshaped color channels, executing a second intra-channel analysis according to the re-distributed sub-ranges of values for the reshaped color channel and modifying at least brightness and contrast data for the at least one reshaped color channel, according to an analysis of a population of images, to form a color balanced image;
   displaying a plurality of thumbnail views of the color balanced digital image, wherein each view in the displayed plurality of views is varied from other views in either or both brightness and contrast;
   and
   responding to a first operator instruction that selects one of the thumbnail views by displaying an enlarged view of the color balanced digital image having image brightness and contrast levels associated with the selected thumbnail view.

10. The method of claim 9 further comprising storing or transmitting the operator-selected image.

11. The method of claim 9 wherein displaying the plurality of thumbnail views further comprises identifying a central image as a view having brightness between the lowest and highest brightness values for the plurality of thumbnail views and having contrast between the lowest and highest contrast values and displaying the thumbnail view corresponding to the central image and other thumbnail views in an array.

12. The method of claim 9 further comprising changing image contrast or brightness in response to additional operator instructions for image adjustment.

13. The method of claim 9 wherein the one or more statistical values is a mean or median.

14. The method of claim 9 further comprising splitting the first or second sub-range to form a third sub-range.

15. The method of claim 9 further comprising calculating skewness of the distribution of the digital values.

16. The method of claim 9 further comprising calculating kurtosis of the distribution of the digital values.

17. The method of claim 9 wherein the first color channel is a green color channel.

18. A method for image processing, the method executed at least in part by a computer system and comprising:
   acquiring a digital image as a collection of image pixel data;
   identifying the acquired digital image as a faded image according to range information from two or more color channels;
   calculating a statistical mean for at least one color channel;
   reshaping each color channel of the acquired digital image by:
   (i) expanding the range of values within the channel;
   (ii) identifying at least first and second non-overlapping sub-ranges of the expanded range of values, wherein a boundary between the sub-ranges is defined according to the calculated statistical mean;
   (iii) re-distributing values by expanding the first sub-range and compressing the second sub-range;
   for at least one of the reshaped color channels, executing a second intra-channel analysis according to the re-distributed sub-ranges of values for the reshaped color channel and modifying at least brightness and contrast data for the at least one reshaped color channel, according to an analysis of a population of images, to form a color balanced image;

displaying a plurality of thumbnail views of the color balanced digital image, wherein each view in the displayed plurality of views varies from other views in either or both brightness and contrast;

and responding to a first operator instruction that selects one of the thumbnail views by displaying an enlarged view of the color balanced digital image having image brightness and contrast levels associated with the selected thumbnail view.

19. The method of claim 18 wherein expanding the sub-ranges for each of the color channels uses a linear expansion.

* * * * *